United States Patent
Kössldorfer

(10) Patent No.: US 6,532,287 B1
(45) Date of Patent: Mar. 11, 2003

(54) NETWORK ELEMENT, LOCAL EXCHANGE, OR ACCESS NETWORK OF A TELECOMMUNICATIONS NETWORK FOR SETTING UP CONNECTIONS FROM AND/ OR TO SUBSCRIBER CONNECTIONS OF THE NETWORK AND METHOD FOR CONTROLLING AND/OR CONFIGURING INTERMEDIATE INTERFACES OF THE NETWORK

(75) Inventor: Max Kössldorfer, Vienna (AT)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/630,151

(22) Filed: Jul. 31, 2000

Related U.S. Application Data

(63) Continuation of application No. PCT/DE99/00096, filed on Jan. 18, 1999.

(30) Foreign Application Priority Data

Jan. 29, 1998 (DE) .......................................... 198 03 482

(51) Int. Cl.[7] .............................................. H04M 7/00
(52) U.S. Cl. ...................................... 379/219; 379/229
(58) Field of Search ................................ 379/230, 142, 379/229, 219; 455/422; 709/223; 370/437, 248

(56) References Cited

U.S. PATENT DOCUMENTS

| | | | | |
|---|---|---|---|---|
| 5,781,623 A | * | 7/1998 | Khakzar ...................... | 379/230 |
| 5,799,153 A | * | 8/1998 | Blau et al. .................. | 709/223 |
| 5,910,980 A | * | 6/1999 | Ogasawara et al. ......... | 379/142 |
| 6,122,504 A | * | 9/2000 | Niepel et al. ................ | 455/422 |
| 6,222,849 B1 | * | 4/2001 | Cornes et al. ............... | 370/437 |
| 6,259,676 B1 | * | 7/2001 | Kellock et al. ............. | 370/248 |
| 6,259,784 B1 | * | 7/2001 | Antila et al. ................. | 379/229 |

FOREIGN PATENT DOCUMENTS

EP 0 812 077 A1 12/1997

OTHER PUBLICATIONS

"Towards a global V5 interference" (James et al.), dated May 23, 1993, BT Laboratories, pp. 873–877.
"V5 Interfaces between Digital Local Exchanges and Access Networks" (Khakzar), dated Jan./Feb. 1994, No. 1/2, Berlin, DE, pp. 45–50.
"Bearer Channel Connection (BCC)"ETS 300 347–1, dated Sep. 1994, p. 26.

* cited by examiner

*Primary Examiner*—Zarni Maung
*Assistant Examiner*—Jungwon Chang
(74) *Attorney, Agent, or Firm*—Laurence A. Greenberg; Werner H. Stemer; Gregory L. Mayback

(57) ABSTRACT

A device and a method for controlling and/or configuring an intermediate interface connecting two network elements, i.e., local exchange and access network, in a telecommunications network for setting up and maintaining subscriber connections in the network includes a number of intermediate paths. Each path has transmission channels for interchanging user information for subscriber connections, for interchanging communication information to control subscriber connections, and for controlling administration of the intermediate paths and intermediate interfaces. A transmission channel in the interface is intended for use as a protected channel for communication information for administration of the intermediate interface. Each protected channel is administered with a communication channel entity. Information relating to the protection of protected channels is transmitted using a protection protocol, with at least two channels reserved for this purpose. At least two protection units are provided for their administration, i.e., in a network element, and can point not only to a communication channel entity assigned to a protected channel, but also to a further communication channel entity assigned to a channel for the protection protocol.

8 Claims, 4 Drawing Sheets

NETWORK ELEMENT, LOCAL EXCHANGE, OR ACCESS NETWORK OF A TELECOMMUNICATIONS NETWORK FOR SETTING UP CONNECTIONS FROM AND/ OR TO SUBSCRIBER CONNECTIONS OF THE NETWORK AND METHOD FOR CONTROLLING AND/OR CONFIGURING INTERMEDIATE INTERFACES OF THE NETWORK

CROSS-REFERENCE TO RELATED APPLICATION

This application is a continuation of copending International Application No. PCT/DE99/00096, filed Jan. 18, 1999, which designated the United States.

BACKGROUND OF THE INVENTION

Field of the Invention

The invention lies in the field of telecommunications. The invention relates to a network element of a telecommunications network, for example, a local exchange or an access network. Connections can be set up through the network element from and/or to subscriber connections of the network and the network elements is connected to a further network element through an intermediate interface. In the intermediate interface:

- a number of intermediate paths are provided, with each intermediate path having a number of transmission channels for interchanging user information for the subscriber connections and for interchanging communication information for controlling the subscriber connections and for controlling the administration of the intermediate paths and the intermediate interface or interfaces;
- at least one transmission channel is intended for use as a protected channel for the communication information for administration of the intermediate interface;
- a protection protocol is transmitted and contains information relating to the protection of protected channels; and
- at least two transmission channels are assigned to the transmission of the protection protocol.

The invention also relates to a method for controlling and/or configuring an intermediate interface through which two network elements, for example, a local exchange or an access network, are connected for setting up and maintaining subscriber connections in the network.

In telecommunications networks, network elements are provided as nodes for telecommunication connections. A network element may be set up as an access network for linking subscriber terminals to the network, and/or as a local exchange for linking subscriber connections to one another or to other network nodes or telecommunications networks. To this end, the network elements are networked with one another through intermediate paths that have the transmission capacities required to set up and maintain the telecommunications connections. In order to control and administer the intermediate paths, which respectively connect two network elements, they are combined to form an intermediate interface. As such, an intermediate interface may be made of one or more intermediate paths depending on the organization structure. If necessary, for example, if the intermediate path capacity is sufficiently large or in the case of special network architectures, two network elements may also be networked by two or more intermediate interfaces.

During operation, the intermediate interfaces are administered largely in the network elements themselves. Structures recommended for the architecture, control, and administration of intermediate interfaces are defined in the Standards produced by the European Telecommunications Standards Institution (ETSI) for V interfaces and, in particular, the V5.2 interface. Standards ETS 300 324-1, 'Signaling Protocols and Switching (SPS); V interfaces at the digital Local Exchange (LE), V5.1 interface for the support of Access Network (AN)' and ETS 300 347-1, 'Signaling Protocols and Switching (SPS); V interfaces at the digital Local Exchange (LE), V5.2 interface for the support of Access Network (AN)' describe the specification of the V5.2 interface. A Q3 interface for its configuration is defined in Standards ETS 300 376-1, 'Signaling Protocols and Switching (SPS); Q3 interfaces at the Access Network (AN) for configuration management of VS interfaces and associated user ports' and ETS 300 377-1, 'Signaling Protocols and Switching (SPS); Q3 interfaces at the Local Exchange (LE) for configuration management of VS interfaces and associated customer profiles'. To the extent necessary for understanding the invention, the following text uses FIGS. 1 and 2 to briefly describe the essential features of an intermediate interface, using the example of a V5.2 interface, and its representation in the context of a Q3 interface. Reference should be made to the cited Standards for further information.

FIG. 1 shows an example of a configuration of network elements in a telecommunications network TKN that are connected using a V5.2 interface VIF. The first network element, shown on the left-hand side in FIG. 1, is an access network AN that is used as a concentrator for subscriber terminals TEA. The second network element, on the right in FIG. 1, is a local exchange LE, and is connected through network-internal interfaces to other nodes in the telecommunications network TKN, for example, to other local exchanges LE' or to a service control point SCP, or through a gateway GTW to another telecommunications network TKN'. Obviously, FIG. 1 is only a simple example, although it has all the features required for understanding the invention. A network element such as an access network or an exchange office can be connected through a number of intermediate interfaces to other network elements and, in particular, to one or more network elements as well through in each case more than one intermediate interface, although the intermediate interfaces need not all be V5.2 interfaces.

The network elements AN, LE, and the intermediate interfaces associated with them are configured and administered, for example, from terminals QTL in the form of workstation computers. The terminals QTL are connected to the network elements AN, LE through their own interfaces QIF provided for this purpose, and are referred to as Q interfaces.

As indicated in FIG. 1, the V5.2 interface VIF is provided using a number of intermediate paths in the form of V5 links LNK, which need to be configured as a connecting line configured for 2 Mbit/s. The ETSI Standards mentioned above limit, to a maximum of 16, the number of links that are respectively combined to form a V5.2 interface VIF. According to the ETSI Standards, each link LNK has 32 timeslots of 64 kBit/s each, which are numbered successively from 0 to 31. Timeslot 0 in each link is used for synchronization. The other timeslots are used for information interchange. The other timeslots include the carrier traffic, of course, that is to say, the interchange of user information on the subscriber connections. Some timeslots, however, are used for interchanging communication information. The communication information is interchanged between the two network elements AN, LE in order to control and administer the intermediate interface VIF and the carrier traffic passing through the intermediate interface VIF. A timeslot that is used for interchanging information relating to carrier traffic or communication information is identified with a transmission channel, or channel for short. Because the terminology difference between a timeslot and the channel associated with the timeslot is of secondary importance for understanding of the invention, the two terms are used interchangeably in the following text. Each channel may occupy one or more transmission paths. A channel that is used for communication information is referred to as a communication channel or C channel. A transmission path for a C channel, which is thus used to interchange communication information, is referred to as a communication path or C path.

The communication information transmitted through an intermediate interface VIF is split into protection groups. Each intermediate interface is assigned a Type 1 protection group and a Type 2 protection group. The Type 1 protection group includes the communication protocols for controlling the operating state of the connections and links, and for controlling the allocation of the user information channels. Two timeslots are reserved for the Type 1 protection group, these are associated with different links, for protection reasons. Timeslot 16 in these two links LN1, LN2 is always reserved for the Type 1 protection group. The two links used for the Type 1 protection group are respectively referred to as the primary link LN1 and the secondary link LN2. The transmission of the PSTN protocol for the signals for the PSTN network, and of the ISDN protocols for the ISDN service channels (D channels) and ISDN packet data channels (p channels) are assigned to the Type 1 and/or Type 2 protection group. (The ISDN channels correspond to transmission paths and should not be confused with the transmission channels, in particular the C channels.) Depending on the present requirement, the timeslots 15 and 31 of the primary link LN1 and of the secondary link LN2, as well as the timeslots 16, 15 and 31 of the other links of the intermediate interface VIF, that is to say up to 46 timeslots, are reserved for the Type 2 protection group. Joint use of one timeslot for transmission of the Type 1 protection group and Type 2 protection group is not allowed—in the same way as joint use of timeslots for carrier traffic and the transmission of a protection group. FIG. 2 shows the internal structure of the primary and secondary links LN1, LN2 of the intermediate interface VIF symbolically. The C paths PCP for the Type 1 protection group are always transmitted jointly, that is to say in the same channel. Of the two timeslots TP1, TP2 that are assigned to the Type 1 protection group, only one is used as the C channel for the Type 1 protection group, namely that for the primary link TP1, while the timeslot for the secondary link TP2 is kept available as a reserve (standby). If a defect were to occur in the primary link LN1, the Type 1 C paths PCP are switched to the timeslot TP2, which has been kept free until that point, of the secondary link LN2, as a result of which the secondary link becomes the primary. FIG. 2 furthermore indicates a timeslot TPS assigned to the Type 2 protection group, for example, the timeslot 31 for the primary link. At this point, it should be mentioned that the numbers 1 and 2 in the reference symbols do not refer to the type of protection group, but respectively indicate the primary link LN1 and secondary link LN2.

In order to coordinate the switching of the protection groups, an additional protocol, the protection protocol, is interchanged simultaneously through dedicated transmission paths PP1, PP2 in both the timeslots TP1, TP2 assigned to the Type 1 protection group. These transmission paths are referred to as protection paths in the following text. As is indicated using the example of the standby protection path PP2 on the secondary link LN2, the protection paths are generally not associated with a C channel but, based on the protection architecture of the V5.2 interface, are assigned directly to the timeslots TP1, TP2 reserved for this purpose. Channels that are protected as described by a protection protocol are referred to as protected channels in the following text.

The Q3 Standards ETS 300 376-1 and ETS 300 377-1 mentioned above define a "logical" representation for the "physical" interface VIF just described, onto which the "physical" architecture of the interface is mapped to the extent that it is important for control and administration tasks. Appropriate entities are respectively provided to represent the elements of the physical interface, for example, of the links and the timeslots. The relationships between the entities are modeled on the basis of the "physical" relationships. In most technical implementations, the entities are data objects in one or more data processing programs running in the network element AN, LE or the terminal QTL but, in principle, may also be implemented, for example, by fixed electronic assemblies. English-language-based names are defined for the entities in the Q3 Standards, corresponding to the English terms used for the interface elements.

The representation can be used for control and/or configuration of the intermediate interface in a network element AN, LE, in a terminal QTL, or in the dialog through the Q interface QIF. The representation of a V interface defined in the Q3 Standards is mandatory for the dialog between a network element AN, LE and a terminal QTL through the Q interface QIF connecting them. The Standards do not define the way in which the intermediate interface VIF in a network element is administered. However, it is obvious for the representation used in the Q3 Standards to be used for this purpose as well because it avoids any translation effort between the internal representation in the network element and the standardized representation to be used for the configuration process. Thus, the Q3 Standards provide a highly realistic representation of the physical conditions.

In accordance with the Q3 Standards, a V5.2 intermediate interface is represented by a V5 interface entity in a network element AN, LE and/or on a Q3 interface QIF. V5TimeSlot entities are provided for representation of the timeslots TSL. The C channels are represented by commChannel entities. Based on the association between the timeslots and the C channels, there is a mutual association between commChannels and the v5TimeSlots that correspond to these timeslots. Timeslots or v5TimeSlots that are used do not each correspond to a communication channel or commChannel because a number of timeslots are used, as described above, for the carrier traffic, or are kept free in order to protect communication channels on V5.2 interfaces. The C paths are represented by entities in the commPath class in an analogous way to the C channels and commChannel entities. Various subtypes of commPath are provided, corresponding to the type of protocol transmitted in the C path. The transmission paths for the protection protocol correspond to protCommPath entities (meaning "protection communication path").

Each v5Interface entity must have a v5ProtectionGroup entity that corresponds to the Type 1 protection group (which may be achieved, among other ways, by setting a type attribute, set up for this purpose, to 1). A v5ProtectionGroup may, in general, contain a number of v5ProtectionUnits. These protection units are used to map the assignment of the timeslots to a protection group in the representation. Accordingly, the v5ProtectionGroup entity for the Type 1 protection group contains two protection units that are used for assignment of the two timeslots TP1, TP2 of the primary and secondary links, respectively, to the Type 1 protection group. The protection units have a reference capability, for example, a pointer to a data object or an index, to a commChannel entity. One of these protection units points to the protected communication channel that is assigned to the C paths of the Type 1 protection group. The reference capability for the other protection unit is empty, or inactive. Both protection units point to the v5TimeSlot entities assigned to them. The protCommPath entity for the interface points to the surrounding v5ProtectionGroup entity for the Type 1 protection group. Consequently, there is an indirect association between the protection communication path and the relevant timeslots, through the Type 1 protection group and through the two protection units contained in the Type 1 protection group. In contrast, the number of protection units in the v5ProtectionGroup entity for the Type 2 protection group depends on the signaling traffic and is limited to a maximum of 46, as already described, only by the number of available timeslots.

Although a protCommPath entity does not intrinsically differ from other entities in the commPath class, the type of link with the other entities does, however, differ considerably corresponding to the protection architecture of a V5.2 interface. The differences between the protCommPath entities and the other entities in the commPath class essentially include:

- a protCommPath entity is not assigned to a commChannel entity; however, it is assigned to a v5ProtectionGroup entity; and
- the v5TimeSlot entity (the timeslot) that is assigned to the protCommPath is determined differently, namely by the described indirect association through the v5ProtectionGroup for the Type 1 protection group and its protection units.

The solution, which models the "physical" configuration of a V5.2 interface as well as possible, involves increased effort for processing and administration of the relevant entities due to the non-standard link for the commChannel entities. The invention, therefore, changes the object assignments in the interface representation in a manner that is as simple as possible in order to reduce the effort for processing and administration of an intermediate interface in a network element, or the effort for configuring it.

SUMMARY OF THE INVENTION

It is accordingly an object of the invention to provide a network element, local exchange, and/or access network of a telecommunications network for setting up connections from and/or to subscriber connections of the network and a method for controlling and/or configuring intermediate interfaces of the network that overcomes the hereinaforementioned disadvantages of the heretofore-known devices and methods of this general type and that at least one communication channel entity for respective administration of one protected channel is provided for control and/or configuration of the intermediate interface, and a communication channel entity is provided for each protection protocol transmission channel.

With the foregoing and other objects in view, there is provided, in accordance with the invention, a network element of a telecommunications network for setting up connections from and/or to subscriber connections of the network, the network element connectable to a further network element through at least one intermediate interface, including a number of intermediate paths each having a number of transmission channels for interchanging user information for subscriber connections, for interchanging communication information for controlling subscriber connections, and for controlling administration of the intermediate paths and at least one intermediate interface, at least one of the transmission channels useable as a protected channel for the communication information for administration of the at least one intermediate interface, a transmittable protection protocol containing information relating to protection of at least one protected channel, at least two of the transmission channels for transmitting the protection protocol, at least one communication channel entity for respectively administering the at least one protected channel for at least one of controlling and configuring the intermediate interface, and at least one communication channel entity for each of the transmission channels for the protection protocol.

The solution of the invention results in a simplified relationship structure for interface administration, without affecting the configuration of the interface itself. Compliance with the principle of realistic mapping of the "physical" relationships for the interface by the introduction of additional "fictional" entities allows reduced effort for implementation of a network element, and improves the clarity of the administration, for example, of the databases involved. From experience, such a structure simplification also leads to improved reliability and maintenance-friendliness of the equipment affected.

In accordance with another feature of the invention, the at least one communication channel entity assigned to the at least one protected channel has a reference capability, and there is provided at least two protection units for administering transmission of the protection protocol, each of the at least two protection units having a reference capability to the at least one communication channel entity for each of the transmission channels for the protection protocol.

One preferred embodiment of the invention provides for the administration of the transmission of the protection protocol with respect to the primary and secondary links in that at least two protection units are provided and, in addition to a reference capability to a communication channel entity assigned to a protected channel, each protection unit also has a reference capability to a communication channel entity assigned to a protection protocol transmission channel.

In accordance with a further feature of the invention, the telecommunications network is a local exchange or an access network.

With the objects of the invention in view, there is also provided a method for at least one of controlling and configuring at least one intermediate interface of a telecommunications network through which two network elements are connected for setting up and maintaining subscriber connections in the network, including providing a number of intermediate paths, each of the intermediate paths having a number of transmission channels for interchanging user information for subscriber connections, for interchanging communication information for controlling the subscriber connections, and for controlling administration of the intermediate paths and at least one intermediate interface, applying at least one of the transmission channels as a protected channel for the communication information for administration of the at least one intermediate interface, transmitting a protection protocol containing information relating to protection of the at least one protected channel, assigning at least two of the transmission channels for transmitting the protection protocol, administering each protected channel with a communication channel entity, and administering each protection protocol transmission channel with a communication channel entity.

The advantages are furthermore achieved by a method of the type mentioned initially, in that each protected channel is administered by a communication channel entity, and each protection protocol transmission channel is administered by a communication channel entity.

In accordance with an added mode of the invention, the communication channel entity assigned to a protected channel is provided with a reference capability; and transmission of the protection protocol is administered with at least two protection units, each of the at least two protection units having a reference capability to the communication channel entity assigned to a protection protocol transmission channel.

It is also advantageous for the transmission of the protection protocol to be administered by at least two protection units, in which, in addition to a reference capability to a communication channel entity assigned to a protected channel, a reference capability to a communication channel entity assigned to a protection protocol transmission channel is also used in each protection unit.

In accordance with a concomitant mode of the invention, the telecommunications network is a local exchange or an access network.

Other features that are considered as characteristic for the invention are set forth in the appended claims.

Although the invention is illustrated and described herein as embodied in a network element, local exchange, and/or access network of a telecommunications network for setting up connections from and/or to subscriber connections of the network and a method for controlling and/or configuring intermediate interfaces of the network, it is, nevertheless, not intended to be limited to the details shown since various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

FIG. 4a is a schematic overview of the entity relationships;

FIG. 4b is a schematic detail relating to the commPath entities; and

FIG. 4c is a schematic detail relating to the representation of the protection architecture.

DESCRIPTION OF THE PREFERRED EMBODIMENTS

Figure 1:
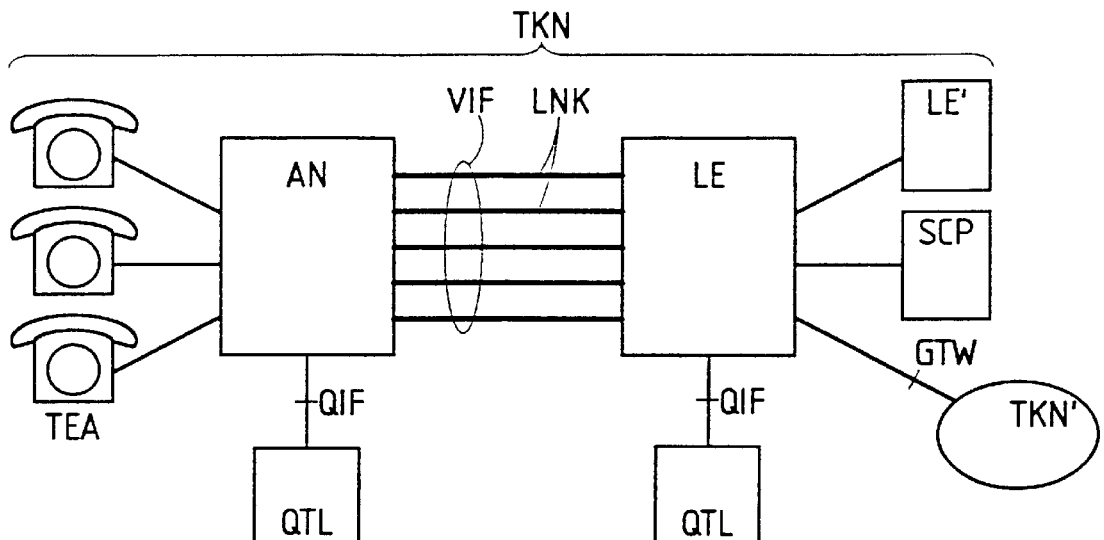
FIG. 1 is a schematic diagram of a prior art telecommunications network having two network elements connected by a V5.2 interface.

In all the figures of the drawing, sub-features and integral parts that correspond to one another bear the same reference symbol in each case.

Figure 2:
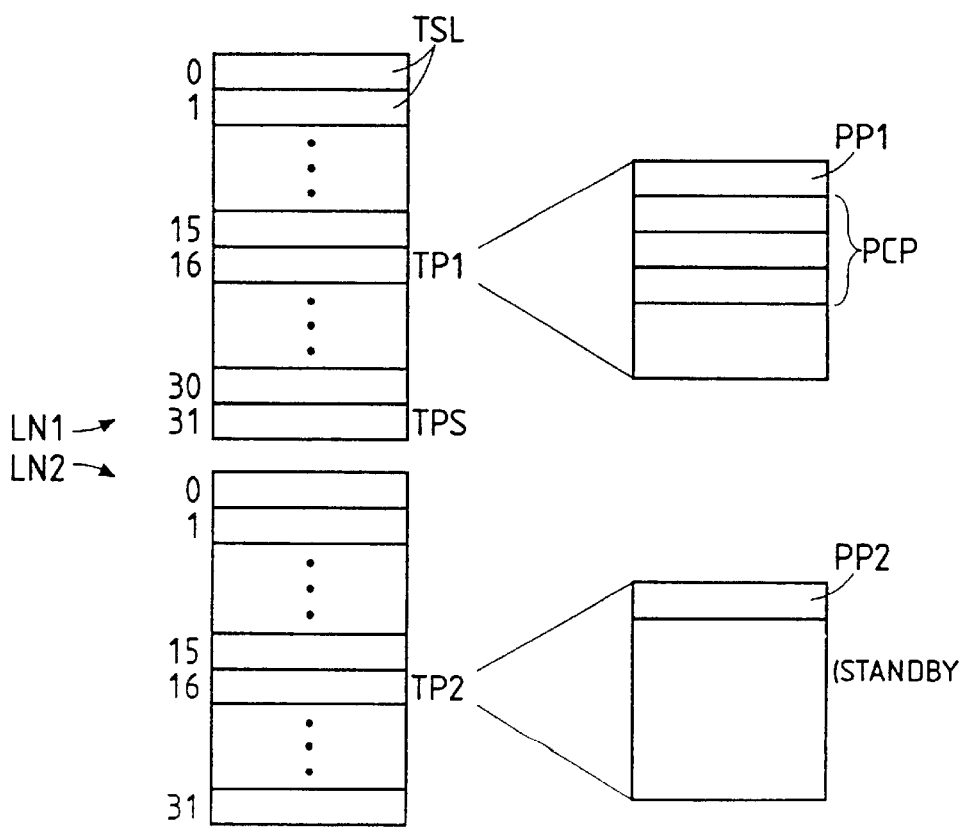
FIG. 2 is a schematic diagram of an internal structure of the primary and secondary links of the intermediate interface of FIG. 1.

The architecture of the V5.2 interface VIF described in the introduction and with reference to FIGS. 1 and 2 is not affected by the invention. Once again, reference should be made to the two ETSI Standards ETS 300 324-1 and ETS 300 347-1 for a more detailed description of the V5.2 interface.

Figure 3:
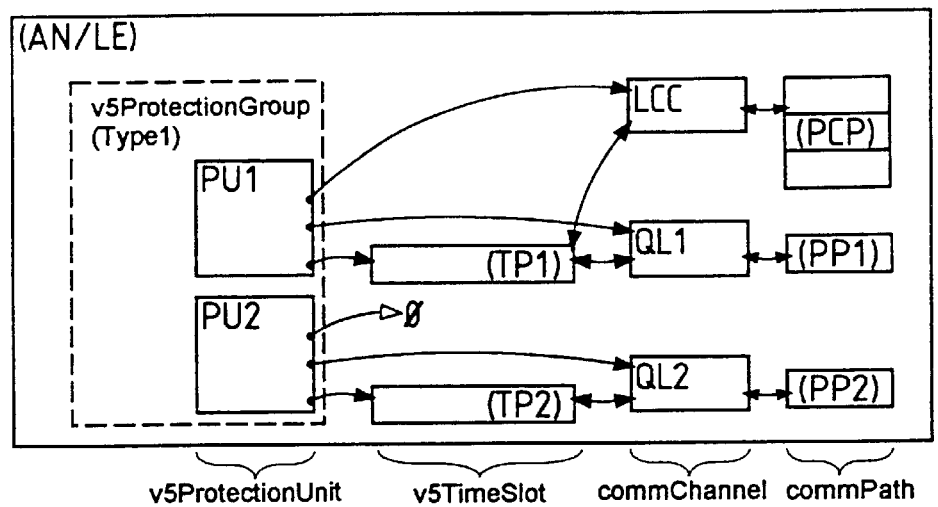
FIG. 3 is a schematic diagram of a representation structure for a Type 1 protection group of an intermediate interface in a network element according to the invention.

Referring now to the figures of the drawings in detail and first, particularly to FIG. 3 thereof, there is shown, schematically, a detail of the structure according to the invention of the interface administration (AN/LE) in one of network elements AN, LE, showing the entities involved with the representation of the Type 1 protection group. Reference symbols in brackets in the drawings denote entities that correspond to the objects shown in FIGS. 1 and 2. As a consequence of the invention, each protCommPath entity, that actually and respectively corresponds to a protection path PP1, PP2, is directly assigned a commChannel entity QL1, QL2 that does not correspond to any C channel in the interface VIF and is, thus, referred to in the following text as a quasi-entity. The indirect association of the protection path with the timeslots TP1, TP2—which are each represented by one v5TimeSlot entity—is now given for the quasi-entities. The two protection units PU1, PU2 of the v5ProtectionGroup entity for the Type 1 protection group now have two pointers to a commChannel entity, one of which points to the commChannel entity LCC of the protected channel with the associated C paths PCP for the Type 1 protection group, or is empty (symbol 0) and, according to the invention, the other can point to the respective quasi-entity QL, QL2.

The presence of the quasi-entities does not comply with the principle, which is followed elsewhere, of realistic modeling of the interface architecture. In this case, the extent of the discrepancy from the "physical" architecture should be kept as small as possible and should be justified by the resultant advantages. The invention achieves the advantages by the considerable simplification of the relationship structures, and by the increased clarity and reliability that result from the simplification.

Figure 4A:
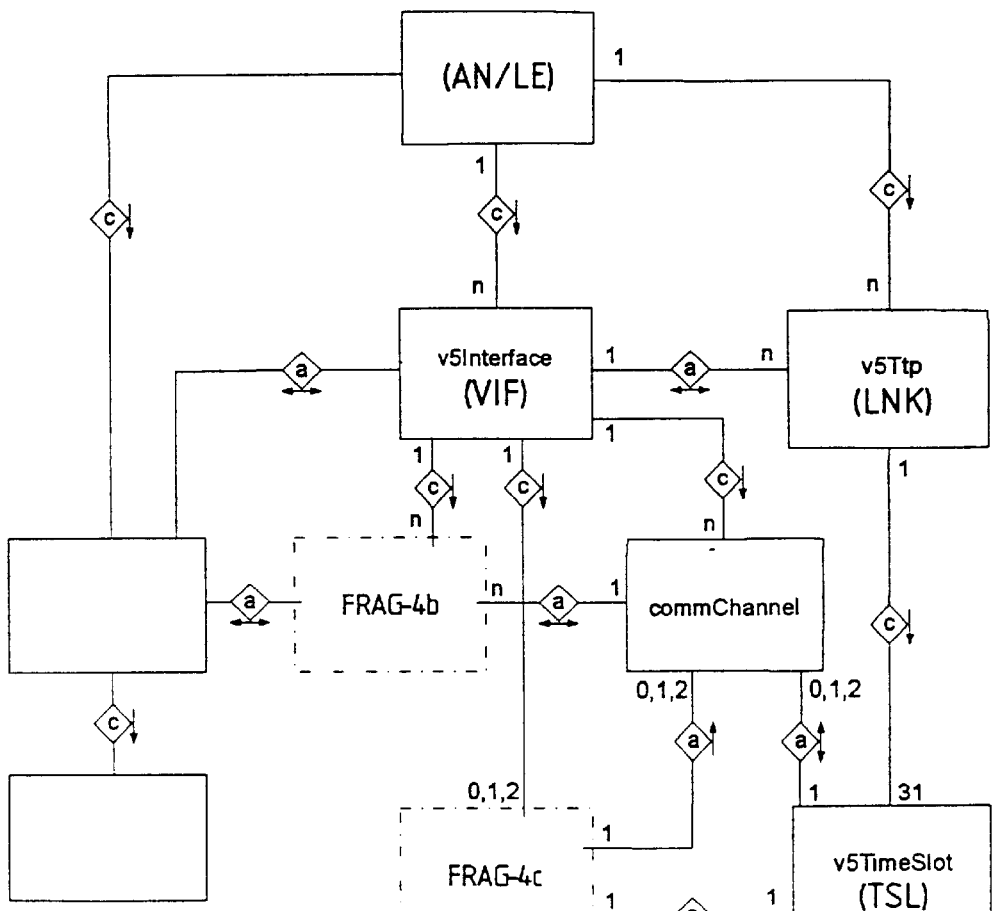
FIGS. 4a to 4c are schematic diagrams of the entities used for representation of an intermediate interface according to the invention, specifically.
Figure 4B:
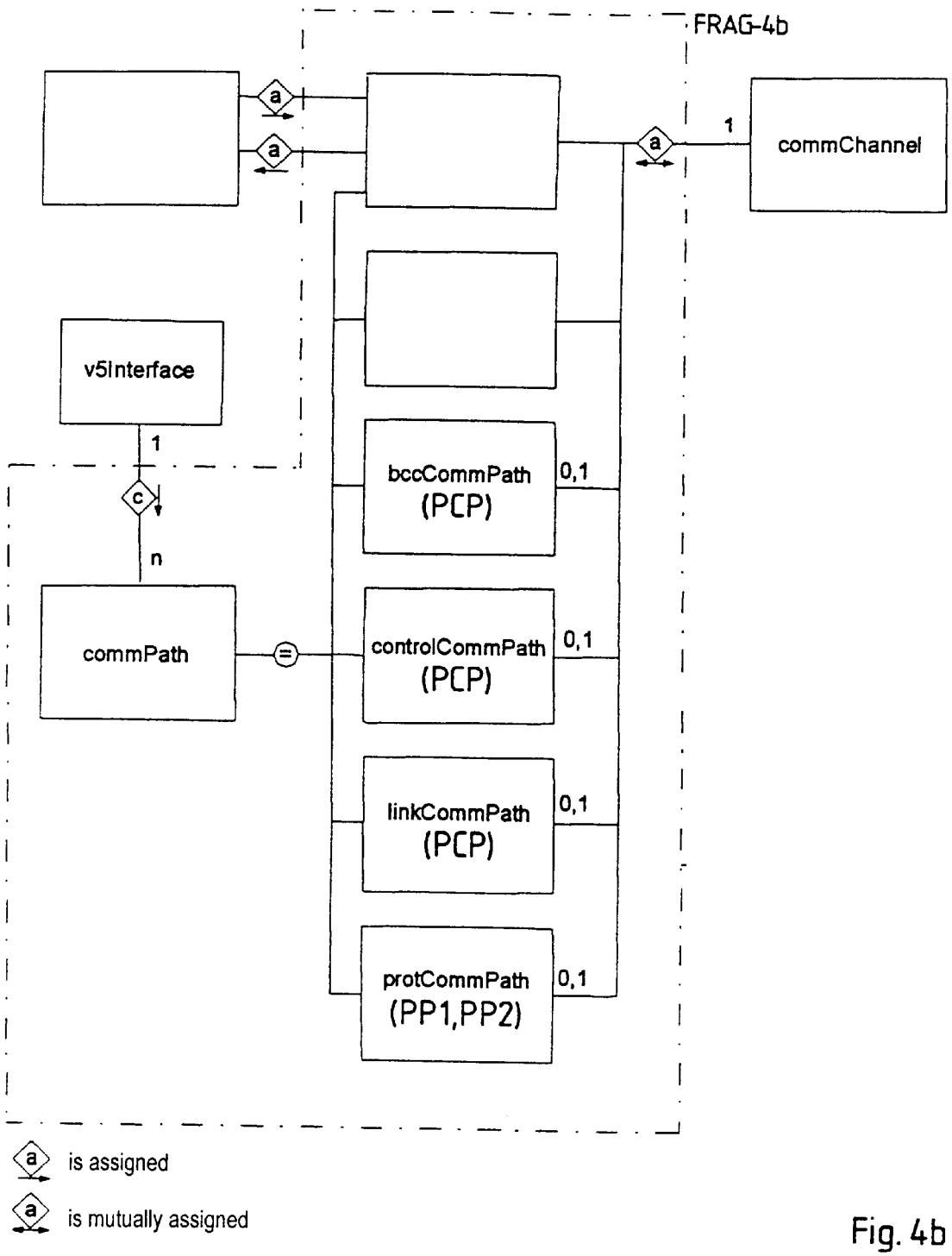
Figure 4C:
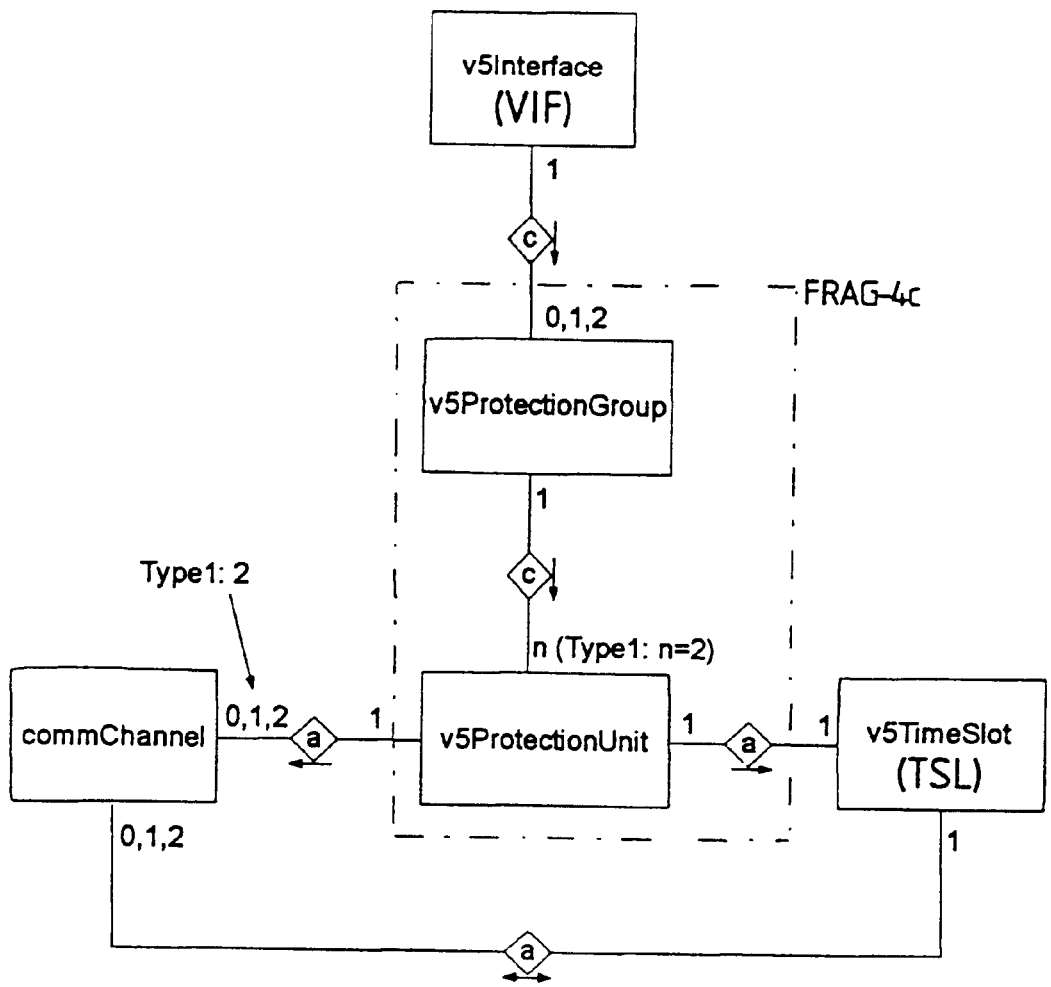

FIGS. 4a to 4c show relationship diagrams of the entities for the Q3 interface representation (AN/LE) modified according to the invention. These three diagrams correspond to the relationship diagrams in FIGS. 1, 3, and 4, respectively, of section 5.1 of the Q3 Standards ETS 300 376-1 and ETS 300 377-1, with the inscription having been suppressed for those parts that have not been changed from the Q3 Standards and that are not relevant to the invention. The relationships are indicated by connecting lines with diamond-shaped symbols, in which the letter indicates the nature of the relationship and the numerals indicate the number of entities involved in each case. For example, the relationship with the letter "c", and with the arrow direction from a first to a second entity, means that the first entity contains the number of second entities indicated by the numeral for the second entity. The letter "a" identifies an association that can be provided by a reference capability, with the arrow direction pointing from the entity originating the reference to the associated entity. A double arrow indicates an association in both directions.

According to FIG. 4a, which shows a summary of the entity relationships, the interface representation (AN/LE) has a number—n indicates a positive number that may be established as required or from the Standards—of v5Interface entities that each correspond to a V interface VIF, and a number of v5Ttp entities (ttp=trail termination point) that each correspond to a termination point of an intermediate path LNK. There is an association in both directions between each v5Interface and the v5Ttp entities associated with it, corresponding to the order of the intermediate paths LNK to intermediate interfaces VIF. Each v5Ttp entity has 31 v5TimeSlot entities that correspond to the timeslots TSL available for information interchange. The rectangular areas FRAG-4b, FRAG-4c with the dashed-dotted boundary refer to the corresponding areas in FIGS. 4b and 4c, which show the other relationships, to the extent that they are relevant for the invention. As a consequence of the invention, there is no direct relationship between the fragment FRAG-4b, which represents a commPath entity or a transmission path, and the fragment FRAG-4c, which contains the protection group; this is a change from the Q3 Standards, in which an association relationship was provided between the fragments.

The v5Interface entity has a number of commPath entities. As indicated by the relationship with the equality symbols in FIG. 4b, each commPath entity must be configured as an entity of one of the commPath subtypes shown in the center of FIG. 4b. A commPath entity, corresponding to the use of the relevant C path, including a bccCommPath, a controlCommPath, or a linkCommPath, which respectively correspond to one of the C paths PCP for the Type 1 protection group, or else a protCommPath, corresponding to a protection path PP1, PP2. Each commPath entity—according to the invention, each protCommPath entity as well—is assigned to a commChannel entity through mutual references, which simulate the association of the C paths and C channels. The analogous association according to the invention of a protCommPath entity leads to one of the already-mentioned quasi-entities QL1, QL2.

FIG. 4c shows the relationship diagram for the protection architecture according to the invention. Corresponding to the association of the timeslots and C channels, there is a mutual association between commChannels and specific v5TimeSlots—as already described, there is no correspondent between every timeslot or v5TimeSlot that is used and a communication channel or commChannel. Each v5Interface entity must have a v5ProtectionGroup entity that corresponds to the Type 1 protection group. A v5ProtectionGroup may contain a number of v5ProtectionUnit entities or protection units. The v5ProtectionGroup entity for the Type 1 protection group contains two protection units PU1, PU2, which are used to assign the two timeslots TP1, TP2 of the primary and secondary links respectively, to the Type 1 protection group. The protection units have a reference capability, for example, a pointer to a data object or an index to a commChannel entity. One of these protection units points to the protected communication channel that is associated with the C paths for the Type 1 protection group. The reference capability of the other protection unit is empty or inactive. Both protection units point to the v5TimeSlot entities associated with them.

According to the invention, each v5ProtectionUnit or protection unit has an additional reference capability that, in the case of the Type 1 protection group, refer to the quasi-entities QL1, QL2. The indirect association of the protection path with the timeslots TP1, TP2—which are each represented by a v5TimeSlot entity—is provided according to the invention through the quasi-entities. That v5TimeSlot entity that is associated with the protCommPath of the protection path is, thus, determined in the same way as for the other commPath entities. Accordingly, the need for the requirement specified in the Q3 Standard for a commPath entity to be assigned to the v5ProtectionGroup entity is eliminated. The two protection units PU1, PU2 of the v5ProtectionGroup entity for the Type 1 protection group now have two pointers to a commChannel entity, one of which points to the commChannel entity LCC of the protected channel with the associated C paths PCP for the Type 1 protection group, or is empty (symbol 0), while the other, according to the invention, can point to the respective quasi-entity QL1, QL2.

The implementation of the invention discussed above relates to the representation of the intermediate interface within the network element, which, as already mentioned, is not defined by the ETSI Standards. Furthermore, the invention may also be used for the Q interface QIF between the terminal QTL and the network element AN, LE, for example, when configuring the network element. The use results in the advantages already described, even though the invention provides for a discrepancy from the Q3 Standard, in the sense of an upgrade. In this case, not only the representation in the network element but also that in the terminal QTL must be implemented according to the invention.

The exemplary embodiments are, of course, not the only possible embodiments of the invention, but should be regarded only as examples. Thus, for example, the grouping of the information contained in an entity of a protection group can also be provided in some way other than by using two protection groups, for example, by direct association of the quasi-entities with the entity in the protection group, or by indirect association through references to other entities.

I claim:

1. In a telecommunications network for setting up connections from and/or to subscriber connections of the network, a network element connectable to a further network element through at least one intermediate interface, the network element comprising:

a number of intermediate paths each having a number of transmission channels for interchanging user information for subscriber connections, for interchanging communication information for controlling subscriber connections, and for controlling administration of said intermediate paths and at least one intermediate interface;

at least one of said transmission channels to be used as a protected channel for the communication information for administration of the at least one intermediate interface;

a transmittable protection protocol containing information relating to protection of at least one protected channel;

at least two of said transmission channels for transmitting said protection protocol;

at least one communication channel entity for respectively administering said at least one protected channel for changing an object assignment in the intermediate interface by at least one of controlling and configuring the intermediate interface; and at least one communication channel entity for each of said transmission channels for said protection protocol.

2. The network element according to claim 1, wherein said at least one communication channel entity assigned to said at least one protected channel has a reference capability, and including at least two protection units for administering transmission of said protection protocol, each of said at least two protection units having a reference capability to said at least one communication channel entity for each of said transmission channels for said protection protocol.

3. In a telecommunications network for setting up connections from and/or to subscriber connections of the network, a local exchange connectable to a further local exchange through at least one intermediate interface, the local exchange comprising:

a number of intermediate paths each having a number of transmission channels for interchanging user information for subscriber connections, for interchanging communication information for controlling subscriber connections, and for controlling administration of said intermediate paths and at least one intermediate interface;

at least one of said transmission channels to be used as a protected channel for the communication information for administration of the at least one intermediate interface;

a transmittable protection protocol containing information relating to protection of at least one protected channel;

at least two of said transmission channels for transmitting said protection protocol;

at least one communication channel entity for respectively administering said at least one protected channel for changing an object assignment in the intermediate interface by at least one of controlling and configuring the intermediate interface; and at least one communication channel entity for each of said transmission channels for said protection protocol.

4. In a telecommunications network for setting up connections from and/or to subscriber connections of the telecommunications network, an access network connectable to a further access network through at least one intermediate interface, the access network comprising:

a number of intermediate paths each having a number of transmission channels for interchanging user information for subscriber connections, for interchanging communication information for controlling subscriber connections, and for controlling administration of said intermediate paths and at least one intermediate interface;

at least one of said transmission channels to be used as a protected channel for the communication information for administration of the at least one intermediate interface;

a transmittable protection protocol containing information relating to protection of at least one protected channel;

at least two of said transmission channels for transmitting said protection protocol;

at least one communication channel entity for respectively administering said at least one protected channel for changing an object assignment in the intermediate interface by at least one of controlling and configuring the intermediate interface; and at least one communication channel entity for each of said transmission channels for said protection protocol.

5. A method for at least one of controlling and configuring at least one intermediate interface of a telecommunications network through which two network elements are connected for setting up and maintaining subscriber connections in the telecommunications network, which comprises:

providing a number of intermediate paths, each of the intermediate paths having a number of transmission channels for interchanging user information for subscriber connections, for interchanging communication information for controlling the subscriber connections, and for controlling administration of the intermediate paths and at least one intermediate interface; applying at least one of the transmission channels as a protected channel for the communication information for changing an object assignment in the at least one intermediate interface by administration of the at least one intermediate interface;

transmitting a protection protocol containing information relating to protection of the at least one protected channel;

assigning at least two of said transmission channels for transmitting the protection protocol;

administering each protected channel with a communication channel entity; and administering each protection protocol transmission channel with a communication channel entity.

6. The method according to claim 5, which further comprises providing the communication channel entity assigned to a protected channel with a reference capability; and administering transmission of the protection protocol with at least two protection units, each of the at least two protection units having a reference capability to the communication channel entity assigned to a protection protocol transmission channel.

7. A method for at least one of controlling and configuring at least one intermediate interface of a telecommunications network through which two local exchanges are connected for setting up and maintaining subscriber connections in the telecommunications network, which comprises:

providing a number of intermediate paths, each of the intermediate paths having a number of transmission channels for interchanging user information for subscriber connections, for interchanging communication information for controlling the subscriber connections, and for controlling administration of the intermediate paths and at least one intermediate interface;

applying at least one of the transmission channels as a protected channel for the communication information for changing an object assignment in the intermediate interface by administration of the at least one intermediate interface;

transmitting a protection protocol containing information relating to protection of the at least one protected channel;

assigning at least two of said transmission channels for transmitting the protection protocol;

administering each protected channel with a communication channel entity; and administering each protection protocol transmission channel with a communication channel entity.

8. A method for at least one of controlling and configuring at least one intermediate interface of a telecommunications network through which two access networks are connected for setting up and maintaining subscriber connections in the telecommunications network, which comprises:

providing a number of intermediate paths, each of the intermediate paths having a number of transmission channels for interchanging user information for subscriber connections, for interchanging communication information for controlling the subscriber connections, and for controlling administration of the intermediate paths and at least one intermediate interface;

applying at least one of the transmission channels as a protected channel for the communication information for changing an object assignment in the least one intermediate interface by administration of the at least one intermediate interface;

transmitting a protection protocol containing information relating to protection of the at least one protected channel;

assigning at least two of said transmission channels for transmitting the protection protocol;

administering each protected channel with a communication channel entity; and administering each protection protocol transmission channel with a communication channel entity.

* * * * *